UNITED STATES PATENT OFFICE.

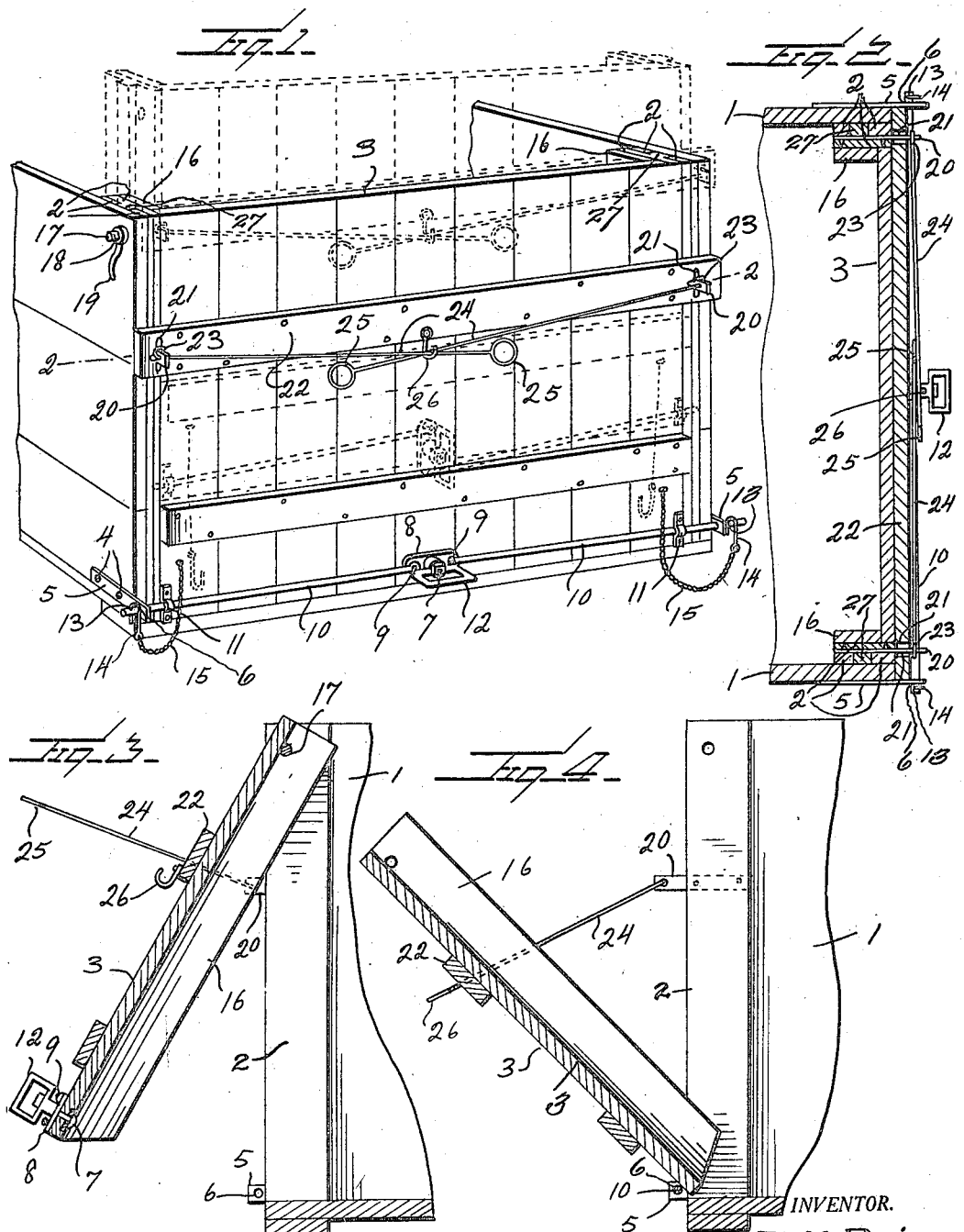

ERI M. PRICE, OF PERCIVAL, IOWA, ASSIGNOR OF ONE-HALF TO MARION B. HOLSCLAW, OF PERCIVAL, IOWA.

TAIL END-GATE FOR WAGONS.

1,384,212.  Specification of Letters Patent.  Patented July 12, 1921.

Application filed September 18, 1920. Serial No. 411,157.

*To all whom it may concern:*

Be it known that I, ERI M. PRICE, a citizen of the United States, residing at Percival, in the county of Fremont and State of Iowa, have invented certain new and useful Improvements in Tail End-Gates for Wagons, of which the following is a specification, reference being had to the accompanying drawings.

The present invention has for its purpose to provide a very simple, efficient and practical construction of a wagon tail end gate, so constructed, as to act as a dump end gate, or as a scoop end gate, or as a slide gate.

Furthermore, the invention aims to provide an end gate having upper and lower detachable pivotal means, whereby the end gate may be swung pivotally upwardly in order that the contents of the wagon may be dumped from the rear immediately adjacent the bottom of the wagon body, or the gate may be moved pivotally downwardly, and supported in its partly moved position, so as to afford what may be termed, a scoop end gate.

Still further, it is the aim to provide means for removing the lower pivotal means of the end gate simultaneously, by simply grasping a handle on the rotating member, in order to remove the pivots from their keepers. Also it is the aim to provide the means for maintaining the lower pivots in their keepers, when the end gate is swung downwardly and rearwardly.

Additionally, the invention provides means for supporting the end gate in its lowered position, said means being disposed to overlie the rear of the gate when closed, to hold the gate in such a closed position.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a perspective view of the rear portion of a wagon body showing the application of the improvided end gate and illustrating the end gate supporting means in position overlying the rear of the gate.

Fig. 2 is a sectional view on the line 2—2 of Fig. 1.

Fig. 3 is a view showing the end gate as swung upwardly and rearwardly on its upper pivot, so that the gate may be used as a dumping end gate.

Fig. 4 is a view showing the end gate as having been swung downwardly, in order that it may be used as a scoop end gate.

Referring to the drawings, 1 designates a conventional form of wagon body which may be of any shape or configuration. The inner faces of the sides of the wagon body, immediately adjacent the tail end gate opening, are provided with upright cleats 2, between which the tail end gate 3 is positioned.

Secured by means of bolts 4 to the outer faces of the sides of the wagon body adjacent their lower portions are metallic straps 5. These straps project rearwardly beyond the sides of the wagon body and have openings 6 constituting keepers. Pivotally mounted on a bolt 7 (which passes through the end gate) is an oscillatory plate 8. Pivoted to the ends of the plate, as at 9, are the adjacent ends of the pivot rods 10. These rods 10 slide in strap bearings 11, which are secured, as shown, to the end gate. It will be noted that the rods 10 are capable of movements toward and from each other, by moving the plate 8 on its pivot bolt. A U-shaped handle, 12, is affixed, as shown, to the plate 8, and is adapted to be grasped by the hand, for the purpose of turning the plate and the bolt. Normally, the rods are moved laterally in opposite directions, so that their outer extremities will engage the keepers 6. When the rods are so engaged in the keepers, the end gate may be moved pivotally downwardly and rearwardly, whereby the gate may be employed as a scoop end gate. The extremities of the rods 10 at points beyond the keepers are provided with openings 13, to receive the curved hooks 14 which are suspended from the gate by means of the chains 15. By means of these hooks the extremities of the rods 10 are held in the keepers, hence preventing the plate 8 from being oscillated on its pivot bolt. However, when it is desired to permit the gate to be raised upwardly and rearwardly, the handle of the plate may be grasped and the plate rotated, thereby moving the rods 10 toward each other, that is, subsequently to removing the hooks.

The inner face of the gate adjacent its opposite vertical edges is provided with cleats 16, and passing through these cleats and through the cleats 2 and the sides is a pivot rod 17. The opposite ends of this rod 17 have threads 18 for engagement with the screw plates 19 the removal of which will permit the rod 17 to be withdrawn so that the gate may be swung downwardly and rearwardly on its lower pivots. The rod 17 constitutes a pivot, to permit the end gate to be swung upwardly and rearwardly.

Carried by and secured to the cleats 2 are metallic straps 20, which extend rearwardly and are positioned a short distance downwardly from the upper ends of the cleats. The straps 20 project through slots 21 formed in the end portions of a cleat 22, which is secured in any suitable manner, as shown, to the rear face of the end gate. Each of the slots 21 is provided with restricted end portions and a central enlarged portion thereby permitting of a free passage of the projecting end of the strap 20. The projecting ends of the straps 20 have openings in which the hooks 23 of the supporting rods 24 are connected. The rods 24 terminate in large loop handles 25, upon which the end portions of the cleat 22 rest when the end gate is in a lowered position. When the end gate is in a raised or closed position the rods 24 overlie the cleat 22 and are supported in intersecting positions by means of a hook 26, which is pivotally carried by the cleat 22. When the rods 24 are so disposed in engagement with the hook 26, the end gate is held closed, and against movement downwardly. When the gate is lowered so that it may be used as a scoop end gate, the rods 24 are removed from the hook, so that the cleat 22 may be moved downwardly on the rods, whereby the enlarged loop handles at the ends of the rods 24 may act to support the gate.

There are three cleats, 2, on each side of the wagon body. Certain of these cleats 2 are spaced to form guides, while the other cleats 2 are provided with ribs 27, which are mounted to slide in the guides. It is obvious that when the pivot rods 10 and 17 are removed, and the rods 24 are in engagement with the hook 26, the end gate carrying the innermost cleats 2 may be raised vertically, the guides acting to maintain the cleats in perpendicular positions, thereby not only providing a tilting gate, but also, affording a vertically movable gate. Furthermore, it is obvious that while the gate is in a raised position, also, the innermost adjacent cleats, the rod 17 may be inserted through the upper portions of the innermost adjacent cleats, and through the cleats of the end gate, so that the gate may be moved pivotally upwardly and rearwardly while such cleats are in their elevated positions.

The invention having been set forth, what is claimed as new and useful is:

In an end gate construction, a wagon body, parallel spaced guides on the inner faces of the sides of the body adjacent the end gate opening, an end gate for the end gate opening, cleats permanently fastened to the inner face of the end gate adjacent its side ends, additional cleats slidably engaging said guides, means for detachably connecting the additional cleats to the ends of the end gate adjacent the outer faces of the first cleats, means for pivotally connecting the upper and lower portions of the gate on the additional cleats, so that either the upper or lower end of the gate may be swung open when the first means are extended, the construction and arrangement of each of the pivotal means being such that by their removal when the first means are returned to folded or retracted positions, the additional cleats may slide vertically on the first cleats and carry the gate therewith, said means for detachably connecting additional cleats to the ends of the gate being extensible through the end gate and located between the upper and lower pivoting means, for limiting the gate in its opening movement, when swung either from the top or the bottom.

In testimony whereof I hereunto affix my signature.

ERI M. PRICE.